(12) United States Patent
Woodard et al.

(10) Patent No.: US 6,945,728 B2
(45) Date of Patent: Sep. 20, 2005

(54) MECHANICAL FASTENER

(75) Inventors: Craig B. Woodard, Franklin, TN (US); William D. Lamb, Lebanon, TN (US)

(73) Assignee: Orchid Automation, LLC, Brentwood, TN (US)

( * ) Notice: Subject to any disclaimer, the term of this patent is extended or adjusted under 35 U.S.C. 154(b) by 0 days.

(21) Appl. No.: 10/164,859

(22) Filed: Jun. 7, 2002

(65) Prior Publication Data

US 2003/0228186 A1 Dec. 11, 2003

(51) Int. Cl.[7] .................................. B25G 3/28
(52) U.S. Cl. ................. 403/282; 403/248; 403/274; 403/277; 403/280
(58) Field of Search .................. 403/355, 358, 403/359.6, 383, 408.1, 248–251, 255, 280, 274, 277; 74/473.25, 503, 504, 282; 411/15–80.6; 297/354.1, 354.11

(56) References Cited

U.S. PATENT DOCUMENTS

| | | | |
|---|---|---|---|
| 2,640,618 A | * | 6/1953 | Hale ........................... 403/277 |
| 3,338,604 A | | 8/1967 | Van Buren, Jr. |
| 3,480,306 A | | 11/1969 | Hsu |
| 4,684,280 A | * | 8/1987 | Dirkin et al. ................ 403/356 |
| 5,046,693 A | * | 9/1991 | Browne ....................... 403/290 |
| 5,149,235 A | * | 9/1992 | Ollis ........................... 411/41 |
| 5,259,689 A | | 11/1993 | Arand et al. |
| 5,340,195 A | * | 8/1994 | Notta ........................... 29/505 |
| 5,383,376 A | * | 1/1995 | Thorman et al. ............ 403/383 |
| 5,628,475 A | * | 5/1997 | Warnaar ..................... 242/571.4 |
| 5,729,948 A | | 3/1998 | Levy et al. |
| 5,980,174 A | * | 11/1999 | Gallagher et al. ........... 403/282 |
| 6,217,115 B1 | | 4/2001 | Downey et al. |
| 6,230,600 B1 | | 5/2001 | Stroud |
| 6,234,734 B1 | * | 5/2001 | Klippel ........................ 411/42 |
| 6,575,659 B1 | * | 6/2003 | Valtwies et al. ............ 403/368 |
| 6,599,059 B2 | * | 7/2003 | Calandra et al. ............ 411/44 |

FOREIGN PATENT DOCUMENTS

DE 10144832.5 * 9/2001 ............ B60N/2/22

* cited by examiner

Primary Examiner—Daniel P. Stodola
Assistant Examiner—Victor MacArthur
(74) Attorney, Agent, or Firm—Baker & Daniels

(57) ABSTRACT

A mechanical fastener assembly having a first member and an insert. The first member includes a cavity into which the insert is forced. The insert includes a body portion having a non-circular cross section defined by a plurality of arcuate sections. Forcing the insert into the first member, which may be a tubular member, firmly engages the insert with the first member. The first member is securable to a second member by positioning a portion of the first member within an opening in a second member. The opening in the second member may be configured to correspond to the cross sectional shape of the body portion of the insert. The body portion of the insert outwardly deforms the first member into engagement with the second member to thereby secure the assembly and prevent the relative axial and rotational movement between the insert, first member and second member.

8 Claims, 3 Drawing Sheets

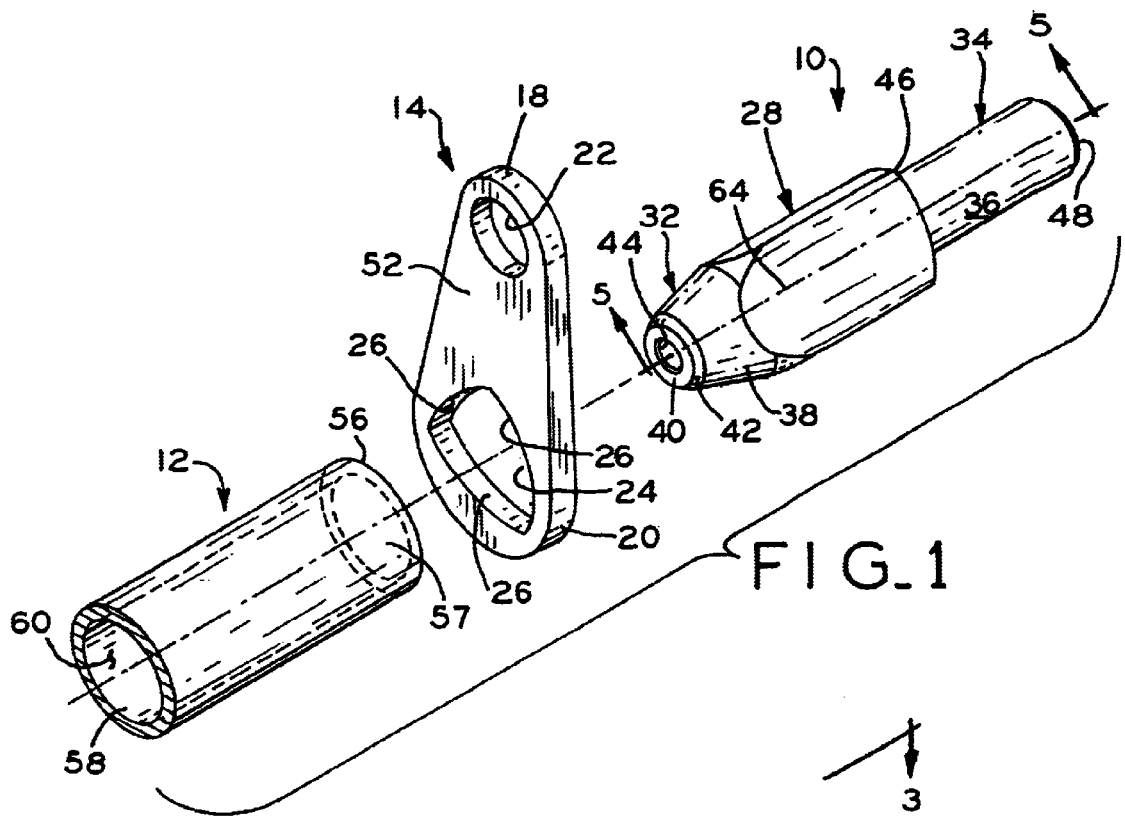
FIG_1
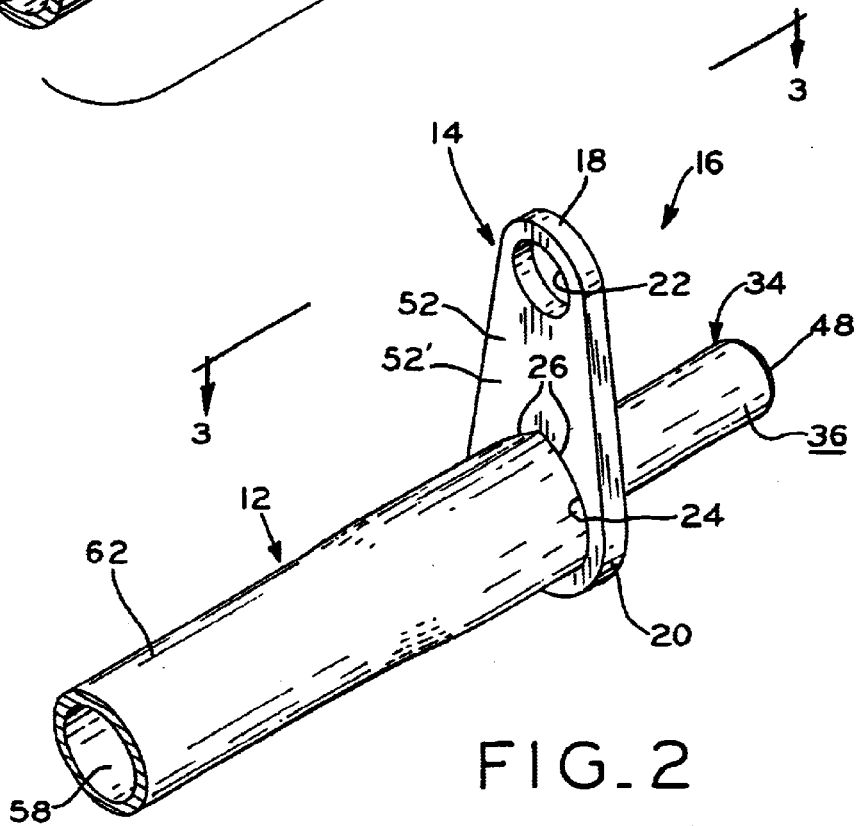
FIG_2

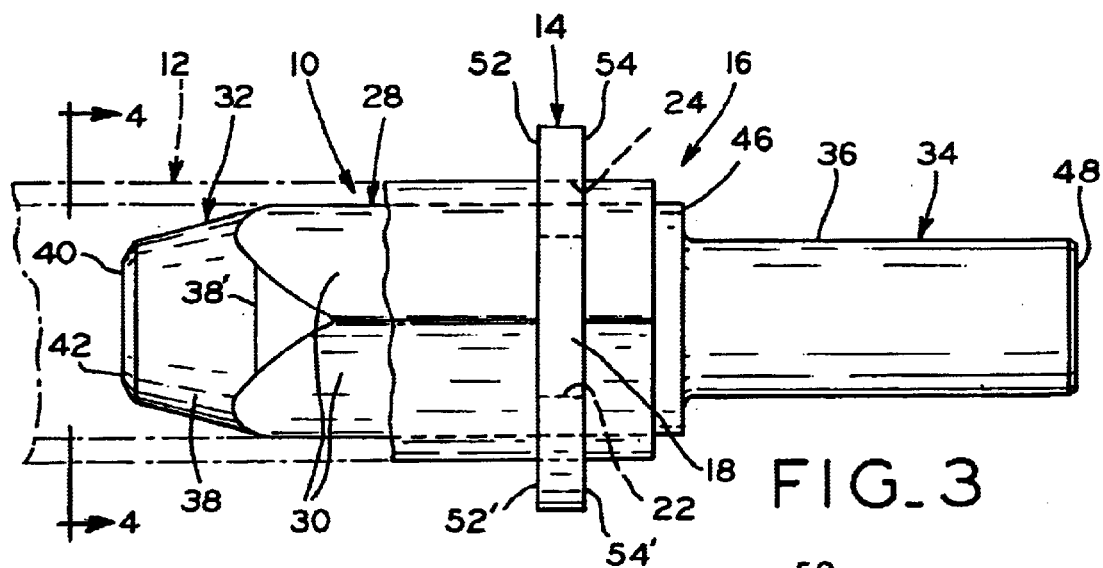
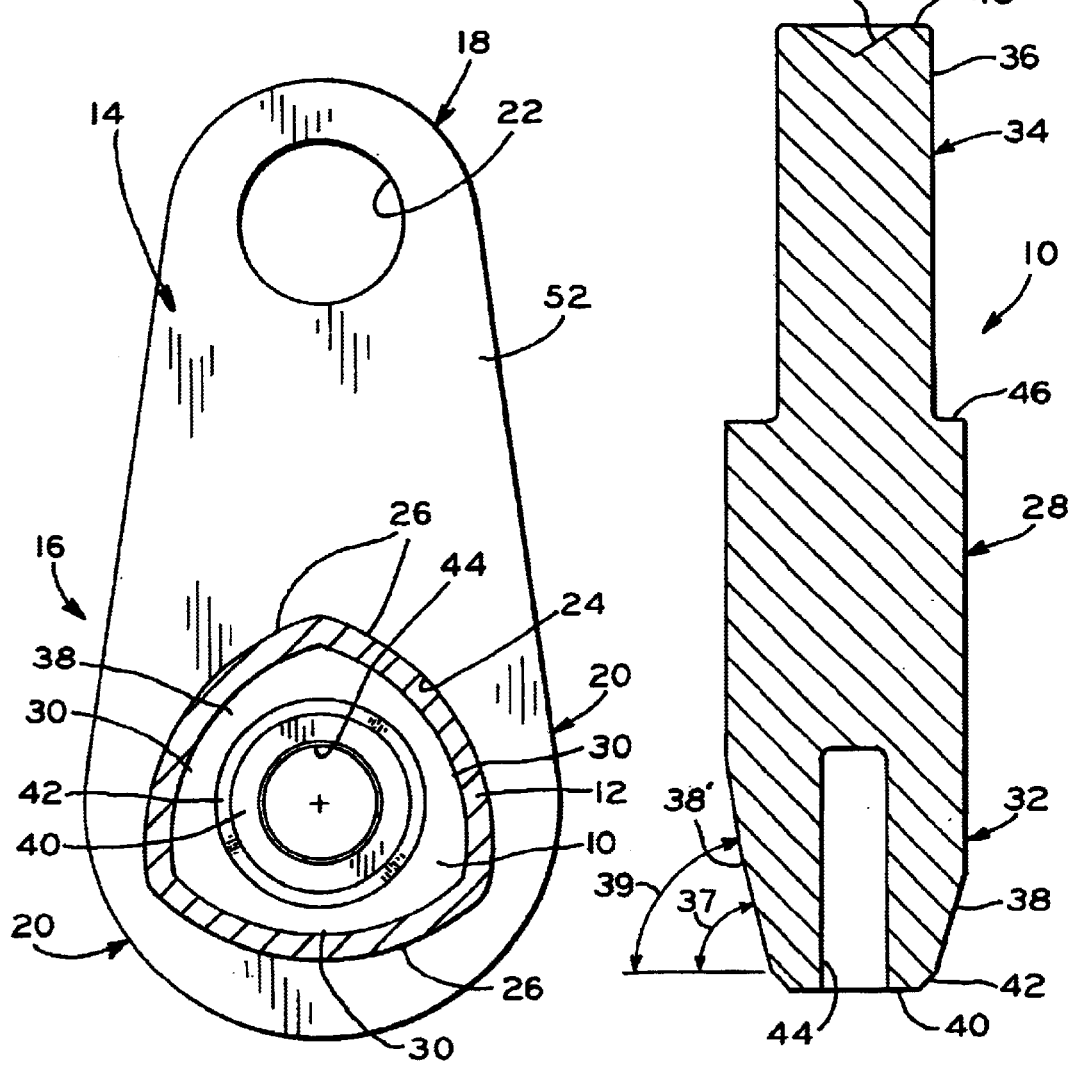
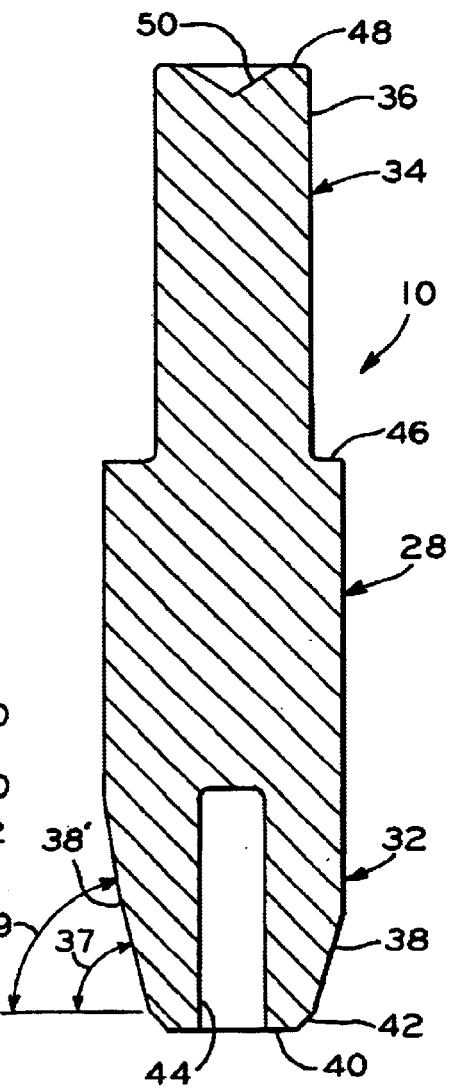

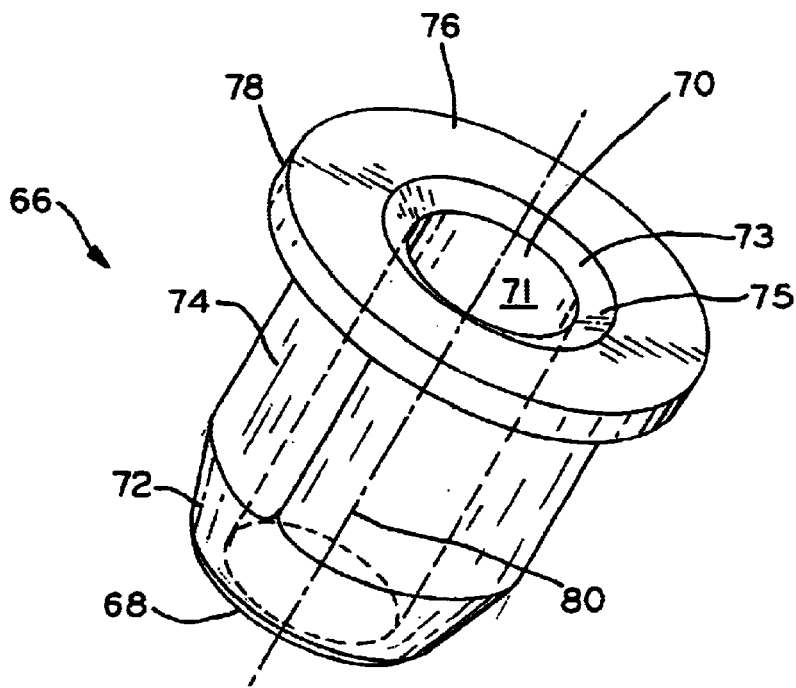
FIG_6
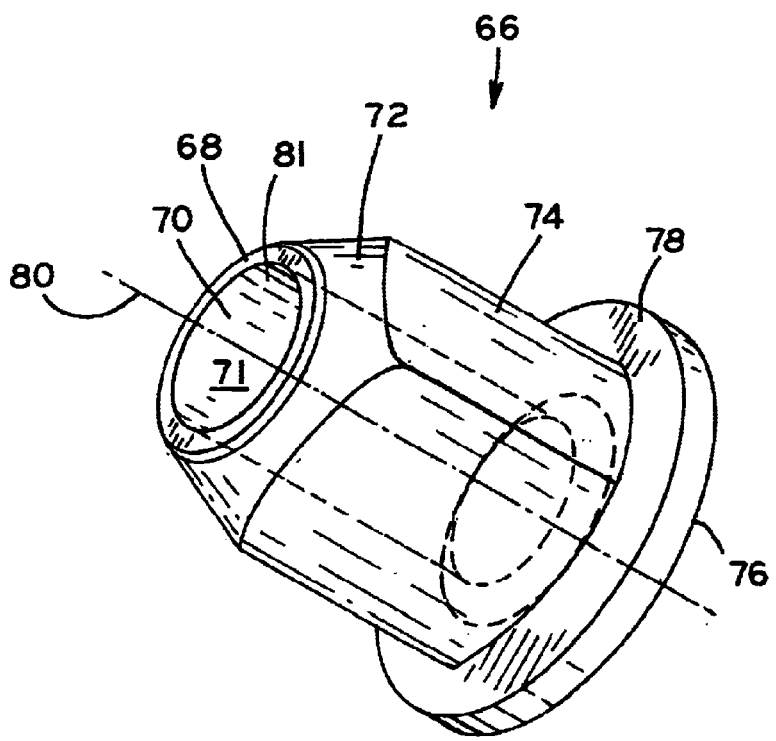
FIG_7

MECHANICAL FASTENER

BACKGROUND OF THE INVENTION

The present invention relates to a mechanical fastener and more particularly to a mechanical fastener used to secure a tube and a linkage of a linkage assembly such as those found in automobile seat assemblies.

A wide variety of conventional mechanical fasteners are known, including fasteners used to secure tubular members. For example, mechanical fasteners are used in automobile seat assemblies to axially and rotationally secure a tubular member to a linkage. The linkage may then be secured to a support which provides the mounting for the seat assembly. It is also known to weld such tubes to a linkage for use in an automobile seat assembly.

One such known fastener which can be used to secure a tube to a linkage in an automotive seat assembly comprises an insert having a main body portion with a hexagonal cross section. One end of the hexagonal insert may be tapered with the diameter of the inserted end being smaller than the hexagonally shaped main body portion. After the tube is positioned within an opening in the linkage, the tapered end of the insert is forced into the open end of the tube. The tube is deformed outwardly by the insert to engage the linkage and thereby secure the tube within the opening in the linkage.

When using a hexagonal shaped insert, the tube will oftentimes not completely conform to the shape of the hex insert. Instead the tube will engage the insert at the intersection of the flats of the hexagonal portion of the insert leaving spaces between the flats of the insert and the inner diameter of the tube. Since the tube and insert are not engaged at those locations where the tube is spaced from the insert, the surface area of the tube and insert at such spaced apart locations does not directly contribute to the frictional forces retaining the insert within the tube.

Another characteristic of such hexagonally shaped inserts is that such inserts oftentimes have a relatively sharp transition between the tapered portion at the end of the insert and the intersections of the flats of the insert which are present in the hexagonal shaped main body portion of the insert. The geometry of the insert creates stress concentrations in the tube which, if they become too great, can cause the tube to split.

It is desired to provide an improved mechanical fastener which provides a strong connection between a tube and a linkage and limits the potential for splitting the tube during assembly.

SUMMARY OF THE INVENTION

The present invention provides a mechanical fastener assembly. One of the many uses of the present invention is to secure a tubular member and a second member having an opening such as a linkage member in an automotive seat assembly.

The invention comprises, in one form thereof, a first member having a cavity and an opening providing access to said cavity. An insert having a leading end and a second end positioned opposite the leading end is also provided. The leading end and the second end define an axis which extends rearwardly from said leading end to said second end. The insert includes a tapered portion which extends rearwardly from the leading end of the insert and has a progressively larger circumference as it extends rearwardly. The insert also includes a body portion which is positioned rearward of the tapered portion. The body portion has a non-circular cross sectional shape and is defined by a plurality of arcuate sections. The insert and the first member are secured together by inserting the leading end of the insert into the cavity through the opening in the first member whereby the engagement of the body portion of the insert with the internal surface of the first member cavity secures the insert and first member together in a manner which inhibits relative axial and rotational movement between the insert and the first member.

The arcuate sections defined by the cross sectional shape of the body portion of the insert may take the form of three circular arcs, each of the arcs having a substantially equivalent radius and length.

The fastener assembly may also include a second member which defines a second opening, the first member being positionable in the second opening, and wherein engagement of the internal surface of the cavity of the first member by the body portion of the insert outwardly deforms the first member into engagement with the second member at the second opening whereby the first and second members are secured together.

The first member may take the form of a tubular member having an exterior which has a substantially uniform, continuous cylindrical surface, i.e., it does not have any openings extending through the sidewalls of the tubular member. Additionally, the tapered portion of the insert may take the form of a compound taper.

The invention also comprises, in another embodiment thereof, a first member defining a cavity and an opening providing access to said cavity. An insert having a leading end and a second end positioned opposite the leading end is also provided. The leading end and the second end define an axis which extends rearwardly from said leading end to said second end. The insert includes a body portion which is positioned rearward of the leading edge. The insert includes an internal axially extending substantially cylindrical void having an opening at said second end which is adapted to receive a pin to rotatably mount the assembly. A second member having a second opening is also provided. The insert, first member and second member are secured together by positioning the first member in the second opening in the second member and inserting the leading end of the insert into the cavity through the opening in the first member whereby the body portion of the insert engages the internal surface of the first member cavity and deforms the first member into engagement with the second member whereby the insert, first member and second member are secured together in a manner which inhibits relative axial and rotational movement between the insert, first member and second member.

The invention comprises, in another embodiment thereof, a method of fastening which includes providing a first member having a cavity and a first opening providing access thereto, providing a second member which has first and second sides and a second opening extending between the first and second sides, positioning a portion of the first member within the second opening in the second member; and forcing an insert into the cavity of the first member through the first opening, the insert having a body portion with a non-circular cross sectional shape defined by a plurality of arcuate sections and wherein forcing the insert into the cavity engages the body portion of the insert with the internal surface defining the cavity and deforms the first member outwardly into engagement with the second member at the second opening and thereby relatively fixedly secures the first member, second member and insert.

One advantage of the present invention is that the cross sectional shape of the insert provides for a significant area of contact between the insert and the member into which the insert is placed.

Another advantage is that the geometry of the insert and the use of a tapered portion between the leading edge and the body portion of the insert provides for an insert which can be forced into a tubular member without a high incidence of splitting the tube.

A further advantage is that the use of an insert having a body portion with a cross sectional shape comprising a plurality of arcuate sections can be used to secure a tubular member to a second member having an opening with a shape corresponding to the cross sectional shape of the insert body portion to rotationally secure the tubular member to the second member.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is an exploded perspective view of a mechanical fastener assembly including an insert, tubular member and second member in accordance with the present invention;

FIG. 2 is a perspective view of the mechanical fastener assembly of FIG. 1 secured together;

FIG. 3 is a top view of the assembly of FIG. 2 taken along line 3—3;

FIG. 4 is a partial sectional view of the assembly of FIG. 3 taken along line 4—4;

FIG. 5 is a sectional view of the insert of FIG. 1 taken along line 5—5;

FIG. 6 is perspective view of another embodiment of an insert in accordance with the present invention; and FIG. 7 is another perspective view of the insert of FIG. 6.

Corresponding reference characters indicate corresponding parts throughout the several views. Although the exemplification set out herein illustrates multiple embodiments of the invention in several forms, the embodiments disclosed below are not intended to be exhaustive or to be construed as limiting the scope of the invention to the precise forms disclosed.

DETAILED DESCRIPTION OF THE INVENTION

One embodiment of the present invention is illustrated in FIG. 1 which includes an insert 10, a first member 12 and a second member 14. In the embodiment of FIG. 1, first member 12 is a tubular member and second member 14 is a linkage which are used in the manufacture of an automotive seat assembly. Tube 12 can be attached to linkages 14 disposed on opposite sides of a seat adjustment assembly (not shown) by insert 10. When fastener 10, tube 12, and linkage 14 are secured together, they form assembly 16 as shown in FIG. 2.

Linkage 14 has a small radius end 18 and large radius end 20. Substantially circular aperture 22 is formed in small radius end 18 and is used to secure linkage 14, and thus assembly 16, to the automotive seat assembly. Large radius end 20 has an opening 24 which is defined by three arcuate portions 26 and receives tube 12 as discussed in greater detail below.

In the illustrated embodiment, linkage 14 is a substantially planar member having a first side 52 and a second side 54. The first and second sides 52, 54 are oppositely disposed and each define a major planar surface 52', 54' of linkage 14 with opening 24 extending between the first and second sides 52, 54. Linkage 14 may also include ribs formed therein to provide additional strength to the substantially planar linkage 14. Alternative members which are not necessarily substantially planar and having a suitable opening for receiving the first member 12 may also be used with the present invention. Linkage 14 may be constructed from various materials having adequate material strength properties and may be formed by a suitable method including casting, stamping, machining or the like.

In the illustrated embodiments, the first member takes the form of tube 12 which is a substantially cylindrical, hollow member with an open end 56. Tube 12 has an internal surface 58 which defines cavity 60 and an exterior surface 62. In the illustrated embodiments, cavity 60 is substantially cylindrical and exterior surface 62 takes the form of a substantially uniform, continuous cylindrical surface, i.e., there are no slots or gaps cut in tube 12 to facilitate the outward biasing or other deformation of tube 12. Tube 12 may be formed from any suitable material including plastic or metal which permits tube 12 to securely engage both insert 10 and linkage 14 when insert 10 is forced into tube 12 as discussed in greater detail below. For example, SAE/AISI 1008/1010 steel may be used to form tube 12.

Insert 10 has a leading end 40 and a second end 48 positioned opposite the leading end 40. Ends 40, 48 define an axis 64 which extends in a rearward direction from leading end 40 to second end 48. A tapered portion 32 extends rearwardly from the leading end 40 and has an increasing circumference as the tapered portion extends rearwardly. Insert 10 also includes a body portion 28 which, in the illustrated embodiments, is positioned immediately rearward of tapered portion 32. In the illustrated embodiment, body portion 28 has a circumference which is enlarged relative to tapered portion 32, i.e., the circumference of body portion 28 is at least as large as the largest circumference of tapered portion 32. Body portion 28 has a non-circular cross sectional shape which is defined by three arcuate sections 30 to create the tri-lobed shape thereof. In the illstrated embodiments, the three arcuate sections 30 are defined by circular arcs each of the arcs having a substantially equivalent radius and length. For example, arcuate sections 30 may be defined by three circles each having a radius of 10.59 inches and located 120 degrees apart on a circle having a diameter of 7.5 inches which is centered on axis 64.

The arcuate sections 26 of opening 24 are configured to correspond to arcuate sections 30 whereby the opening 24 corresponds to the cross sectional shape of body portion 28 and is slightly larger than the body portion 28. The use of a non-circular cross sectional shape for body portion 28 and an opening 24 which corresponds body portion 28 facilitates the rotational securement of tube 12 within opening 24 by preventing the relative rotation of insert 10 within opening 24.

In the illustrated embodiments, tapered portion 32 is defined by a plurality of tapered surfaces having different taper angles, i.e., a compound taper. A chamfered surface 42 is located immediately rearward of front end 40 and tapered surface 38 extends rearwardly between chamfer 42 and body portion 28. Tapered surface 38 is a compound taper formed by two tapered surfaces having separate angles of inclination. The two tapered surfaces meet at intersection 38' seen in FIG. 5. The front portion of tapered surface 38 forms an angle 37 which is approximately 75-degrees while the rear portion of tapered surface 38 forms an angle 39 which is approximately 80-degrees. Void 44 is formed in insert 10 and has an opening on leading end 40. Void 44 extends axially within insert 10 from leading end 40 rearwardly to a point proximate body portion 28 as best seen in FIG. 5. Void 44 facilitates the cold heading manufacture of insert 10. Void 44 does not collapse inwardly during the forcible entry of insert 10 into tube 12. Since void 44 does not extend through the length of body portion 28, however, the inward deformation of insert 10 along a portion of void 44 would not collapse body portion 28 and thereby prevent insert 10 from functioning and could potentially facilitate the forcible entry of insert 10 into tube 12.

The illustrated embodiment of insert 10 also includes a bearing portion 34 which extends from the rear limit 46 of body portion 28 in a rearward direction to second end 48 of insert 10. In the illustrated embodiment, bearing portion 34 has a substantially cylindrical shape with a diameter smaller than that of body portion 28, however, a bearing portion which has a diameter larger than that of body portion 28 could also be used. If a bearing portion having a larger diameter is used, the bearing portion could also function as a stop and limit the extent to which the insert is forced into the first member, such as tube 12.

Bearing portion 34 includes a bearing surface 36 used in the mounting of assembly 16. Second end 48 of insert 10 also includes a recess 50 which may be used to properly locate insert 10 when performing machining operations during the manufacture of insert 10. Recess 50 is also used in obtaining the TIR (total indicated run out) by facilitating the rotation of insert 10 about its center line or axis 64 and measuring any deviation of the diameter of bearing portion 34. Insert 10 may be manufactured of various materials having adequate material strength properties and formed by a suitable method including casting, machining, cold heading, powdered metallurgy or the like. For example, SAE/AISI 1018 steel may be suitable when forming insert 10 using a cold heading method of manufacture and AISI/SAE 12L14 steel may be suitable when machining insert 10.

Insert 10 is secured to tube 12 by inserting leading end 40 into open end 56 of tube 12. As insert 10 is forced into tube 12, tapered portion 32 first engages the interior surface 58 of tube 12 and then body portion 28 engages interior surface 58. Body portion 28 is configured to have an outer circumference slightly larger than the interior circumference of interior surface 58 whereby body portion 28 deforms tube 12 by thinning the sidewalls of tube 12 and also outwardly expanding the exterior surface 62 of tube 12 where body portion 28 engages interior surface 58. The tight engagement between interior surface 58 and body portion 28 firmly secures insert 10 within tube 12.

When attaching tube 12 to linkage 14, the tube 12 is first positioned within opening 24 and then insert 10 is forced into cavity 60 through tube opening 57 at open end 56. As best seen in FIG. 4, the configuration of arcuate sections 30 enables insert 10 to engage the interior surface 58 of tube 12 along substantially the entire outer circumference of body portion 28 without any gaps creating discontinuities in the engagement between insert 10 and tube 12. Similarly tube 12 engages linkage 14 at opening 24 without any gaps therebetween along substantially the entire outer circumference of tube 12, i.e., tube 12 engages both insert 10 and linkage 14 substantially circumferentially continuously. Body portion 12 outwardly deforms tube 12 to engage linkage 14 at opening 24 and thereby securably fix tube 12 to linkage 14. Although in the illustrated embodiments the deformation of tube 12 is permanent, the present invention would also work with a tube 12 constructed of a material which allowed the tube to regain its original shape if the insert 10 were removed.

As can also be seen in FIG. 4, the engagement of tube 12 with linkage 14 is circumferentially continuous about tube 12. When insert 10, tube 12 and linkage 14 are secured together, as shown in FIGS. 2–4, insert 10, tube 12 and linkage 14 are secured together in manner which prevents relative movement along axis 64 or rotation about axis 64, i.e., insert 10, tube 12 and linkage 14 are axially and rotationally secured together Although frictional engagement between the three parts 10, 12 and 14 may be sufficient to prevent both relative axial and rotational movement of the parts, the non-circular configuration of body portion 28 and corresponding opening 24 also prevents the relative rotation of insert 10 and linkage 14 as well as tube 12 locked therebetween. In illustrated assembly 16, tube 12 is positioned within opening 24 so that when insert 10 forcibly enters tube 12 it takes a position wherein opening 24 surrounds a section of body portion 28.

Insert 66 shown in FIGS. 6 and 7 illustrates a second embodiment of an insert in accordance with the present invention. Insert 66 can also be used with tube 12 and linkage 14 and has a leading end 68, tapered portion 72 and body portion 74 which are similar to those same features of insert 10. The second end 76 of insert 66, however, includes a radially outwardly projection flange 78 and a cylindrical bore 70 extends through the entire length of insert 66 between opening 81 and opening 73 respectively located at leading end 68 and second end 76. Bore 70 is defined by cylindrical interior surface 71 and by an inclined surface 75 at opening 73. Flange 76 acts as a stop and limits the extent to which insert 66 can be forced into tube 12.

The use of a void at the second end 76 of insert 66, which takes the form of bore hole 70 in the illustrated embodiment, permits the insertion of another part therein. The interior surface 71 which defines bore 70 may function as a bearing surface. For example, a pin may be inserted through opening 73 at second end 76 whereby the pin is rotatably mounted in bore 70 to permit the relative rotation of the pin and the insert 66. The pin could extend partially or entirely through the bushing-like insert 66. It is also envisioned that a pin could extend through the entire length of tube 12 and through a second insert 66 located on the opposite side of the tube 12. This allows the insert 66 to not only secure together a first and second member 12, 14 but also rotatably mount the secured first and second member 12, 14 to a device such as an automotive seat assembly. Although insert 66 has a bore 70 which extends the entire axial length of insert 66 (line 80 represents the axis of insert 66), a bore which extends only partially through insert 66 could also be used to rotatably mount the insert. Where such voids extend into body portion 74, body portion 74 substantially maintains its original configuration during insertion of insert 66 into tube 12 and bore 70 retains its substantially cylindrical shape after insert 10 has been secured within tube 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A mechanical fastener assembly for securing a tube to a substantially planar link whereby said tube and link are rotationally secured to one another, said assembly comprising:

a tubular member and having an uninterrupted wall and an internal surface of said wall defining a cavity, said tubular member including an open end defining an opening to said cavity;

an insert having a leading end and a second end positioned opposite said leading end and defining an axis which extends rearwardly from said leading end to said second end, said insert including a tapered portion extending rearwardly from said leading end, said tapered portion having an increase in circumference as said tapered portion extends rearwardly, said insert having a body portion positioned rearward of said tapered portion, said body portion having an enlarged circumference relative to said tapered portion, said body portion defining a plurality of arcuate sections with end points which touch each other and thereby define a non-circular shape which approximates a polygon with bowed out sides, said rear end of said insert comprising an extended bearing portion having a substantially cylindrical shape, said bearing portion extending beyond said body portion and being of smaller circumference than said body portion; and a substantially planar member comprising a link and defining a second opening which extends between two oppositely disposed major planes, said second opening generally conforming to the cross sectional shape of said body portion, said tubular member positionable within said second opening, whereby said tubular member, said insert, and said planar member are axially and rotationally securable together by inserting said leading end into said opening and deforming said tubular member into substantially continuous engagement with said insert and said planar member at said second opening, whereby said tubular member extends at substantially 90° to said planar member and away from one said major plane and said bearing portion extends at substantially 90° to said planar member away from said opposite major plane.

2. The assembly of claim 1, wherein each said arcuate sections is defined by a circular arc, each said arcs having a substantially equal radius and length.

3. The assembly of claim 1 wherein said tapered portion is defined by a compound taper.

4. The assembly of claim 1 wherein said body portion is positioned immediately rearward of said tapered portion.

5. The assembly of claim 1 wherein said second end of said insert and said body portion define a radially outwardly projecting flange.

6. The assembly of claim 1 wherein said insert defines an internal void, said void located substantially centrally of said body and oriented in the direction of said axis.

7. The assembly of claim 6 wherein said void is a substantially cylindrical bore axially extending through said insert between said leading end and said second end.

8. The assembly of claim 1 wherein said second end of said insert comprises an extended bearing portion having a substantially cylindrical shape, said bearing portion extending beyond said body portion and being of smaller circumference than said body portion.

* * * * *